No. 727,674. PATENTED MAY 12, 1903.
C. NORTH.
DEVICE FOR ROASTING AND WARMING PEANUTS OR COFFEE.
APPLICATION FILED FEB. 5, 1903.
NO MODEL.
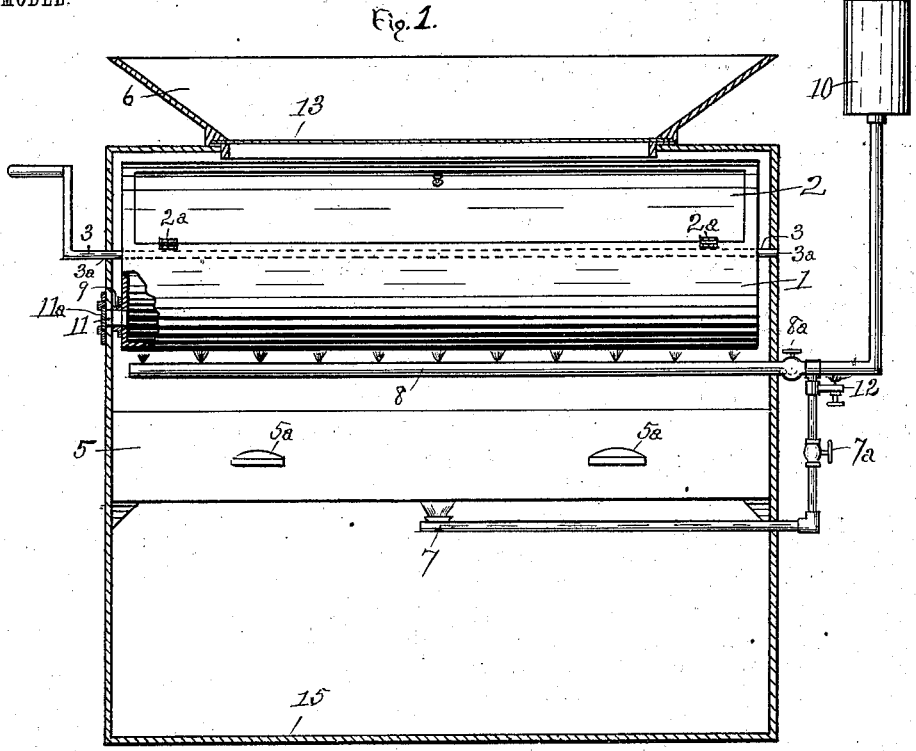
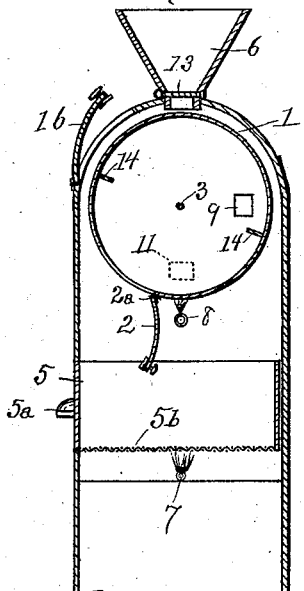
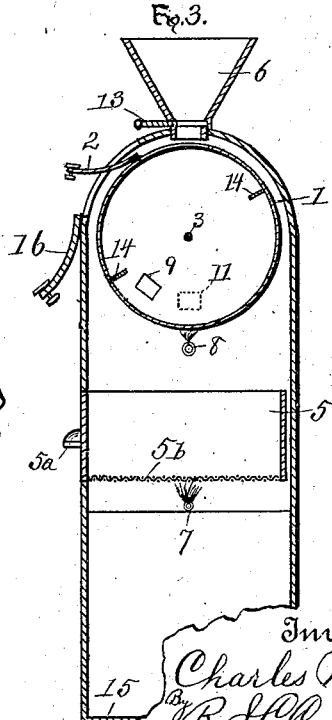
Witnesses
J. B. Caldwell
Chas. W. Cunningham
Inventor
Charles North.
By R. S. Caldwell
Attorney No. 727,674.                                               Patented May 12, 1903.

UNITED STATES PATENT OFFICE.

CHARLES NORTH, OF COLORADO SPRINGS, COLORADO.

DEVICE FOR ROASTING AND WARMING PEANUTS OR COFFEE.

SPECIFICATION forming part of Letters Patent No. 727,674, dated May 12, 1903.

Application filed February 5, 1903. Serial No. 141,955. (No model.)

*To all whom it may concern:*

Be it known that I, CHARLES NORTH, of Colorado Springs, in the county of El Paso and State of Colorado, have invented certain new and useful Improvements in Devices for Roasting and Warming Peanuts or Coffee, of which the following is a specification.

My invention consists principally of a hollow drum or cylinder having a hinged lid, a flange on the inside, and a flanged opening in the end of same corresponding to an opening in the end of the jacket covering the roaster. Above this cylinder I have constructed a hopper with a slide-gate, by means of which the cylinder may be almost instantly filled and without allowing the heated drum to cool. Under this drum is a drawer with a perforated bottom, into which the roasted product is dumped. This perforated bottom allows all dirt and trash to fall through and leaves the nuts or coffee clean and ready for market. Through an opening in the end of the drum and a corresponding opening in the end of the jacket samples of the product may be allowed to escape whenever the operator may think necessary. It will be seen that in this device, however much the opening in the end of the jacket may be left open, the opening in the cylinder is closed and the cylinder practically air-tight except when directly opposite the opening in the jacket, thus preventing the escape of any considerable amount of heat. The cylinder is to be revolved by means of a crank, as shown in the drawings, or by means of any suitable motor or power.

The beneficial objects which I seek to attain by my improvement is to provide an inexpensive roaster in which nuts or coffee may be evenly roasted with a minimum expense and a maximum speed and in which the finished product will be left clean and ready for the market. In order to attain these objects, it is necessary to have a mechanism in which the heat will be evenly distributed, the substance constantly agitated, and from which samples may be frequently or continuously taken.

In the accompanying drawings, Figure 1 is a front elevation showing the hopper and internal construction. Fig. 2 is an end view with the covering removed and showing the internal construction. Fig. 3 is a vertical section from front to rear and shows the position of the various parts while it is in the act of being filled. Fig. 4 shows a detached piece of the end of the jacket having in it an opening with a sliding cover.

Throughout the several figures like characters refer to like parts.

Referring to the details of the device as set out in said drawings, 1 represents the hollow drum or cylinder. 2 represents the hinged lid on said cylinder. $2^a \cdot 2^a$ represent the hinges on said lid.

3 3 represent the rod extending through the cylinder and having bearings at points $3^a \cdot 3^a$. 5 represents the drawer or receptacle under said cylinder, into which the contents of the cylinder is to be dumped. This drawer has a perforated bottom, (shown by $5^b$,) through which dirt and trash may be allowed to escape and to fall on the tight bottom 15. 6 represents the hopper, and 13 the gate to said hopper.

$5^a \cdot 5^a$ are handles on the drawer 5.

7 is a pipe or gasolene-jet by means of which the contents of the drawer 5 may be kept warm.

$7^a$ is a cock to be used to regulate the jet 7.

8 is a perforated pipe extending horizontally under the cylinder 1, which furnishes a sufficient number of jets to properly roast the contents of said cylinder.

$8^a$ is a cock to be used to regulate the flow of gas or gasolene in the pipe 8.

10 is a gasolene-tank from which gasolene is supplied to the generator 12.

9 is a flanged opening in the end of the cylinder 1, the edges of which are turned out, so that they almost come into contact with the jacket. When the cylinder is revolved until this opening is at the lowest point reached by it, said opening is directly in front of the corresponding opening 11 in the end of the jacket. The opening 11 is to be provided with a slide, (represented in Fig. 4 by $11^a$,) which may be entirely closed until the operation of roasting is well advanced and then left open, so that with each revolution a sample may be allowed to escape.

14 is a flange on the inside of the cylinder, which agitates the contents of cylinder and insures even roasting.

16 represents a hinged lid on the side of the jacket near the top, to be constructed of sufficient size to allow the lid 2 to be opened to it.

The method of operation is briefly described as follows: The hopper is filled with the material to be roasted. The lid 16 is opened and the cylinder 1 revolved until the lid 2 appears at the opening. The lid 2 is then opened and thrown back, as shown in Fig. 3. The cylinder is then turned back until the opening in it is under the hopper and the gate in the hopper drawn. When the cylinder is properly filled, lids are closed and the roasting carried on. After the samples indicate that the substance is sufficiently roasted the lids are again opened and the cylinder turned forward until gravity opens the lid 2 and the contents of the cylinder is entirely emptied.

This device may be adapted either to wholesale or retail work. The principal advantages over existing devices are speed in filling and emptying, no loss of heat, and the ease with which samples may be obtained.

Having thus described my invention, what I consider new, and desire to secure by Letters Patent, is—

The combination in peanut and coffee roasters, of a metallic cylinder having an inside flange and a flanged opening in the end, a metallic jacket having a hinged lid and an opening corresponding with that in the cylinder, substantially as described and for the purposes set forth.

In testimony whereof I have hereunto affixed my signature in the presence of two witnesses.

CHARLES NORTH.

In presence of—
　JOHNSON R. DEAL,
　WM. GRIMES.